(No Model.) 2 Sheets—Sheet 1.

W. N. WHITELEY, W. BAYLEY & S. DYER.
KNOTTER FOR GRAIN BINDERS.

No. 363,268. Patented May 17, 1887.

WITNESSES
O. W. Woodruff
J. H. Ingersoll.

INVENTORS.
Wm. N. Whiteley
Wm. Bayley
Samuel Dyer
By their Atty
Attorney (No Model.) 2 Sheets—Sheet 2.

W. N. WHITELEY, W. BAYLEY & S. DYER.

KNOTTER FOR GRAIN BINDERS.

No. 363,268. Patented May 17, 1887.

Witnesses.

Inventors.
W. N. Whiteley
W. Bayley
S. Dyer

UNITED STATES PATENT OFFICE.

WILLIAM N. WHITELEY, WILLIAM BAYLEY, AND SAMUEL DYER, OF SPRINGFIELD, OHIO; SAID BAYLEY AND DYER ASSIGNORS TO SAID WHITELEY.

KNOTTER FOR GRAIN-BINDERS.

SPECIFICATION forming part of Letters Patent No. 363,268, dated May 17, 1887.

Application filed April 17, 1885. Serial No. 162,582. (No model.)

*To all whom it may concern:*

Be it known that we, WILLIAM N. WHITELEY, WILLIAM BAYLEY, and SAMUEL DYER, all of Springfield, Clark county, in the State of Ohio, have invented new and useful Improvements in Knotters for Grain-Binders; and we do hereby declare that the following is a full and accurate description of the same, reference being had to the accompanying drawings, wherein—

Figure 1:
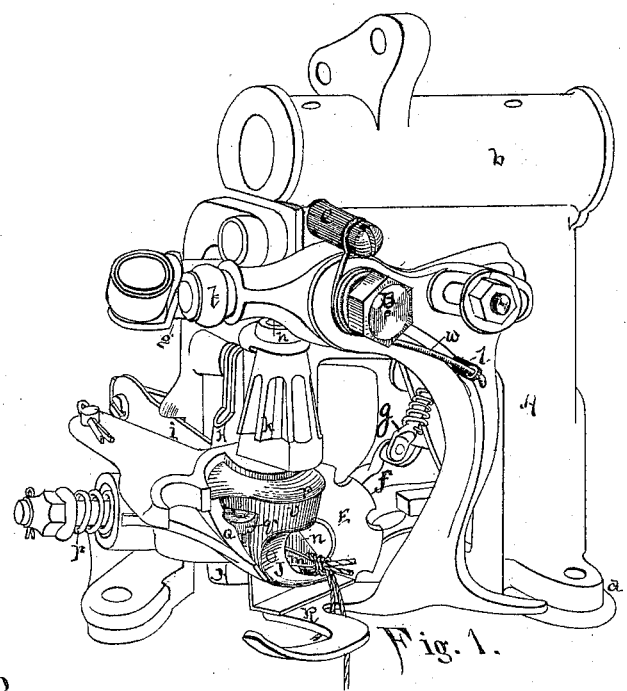
Figure 2:
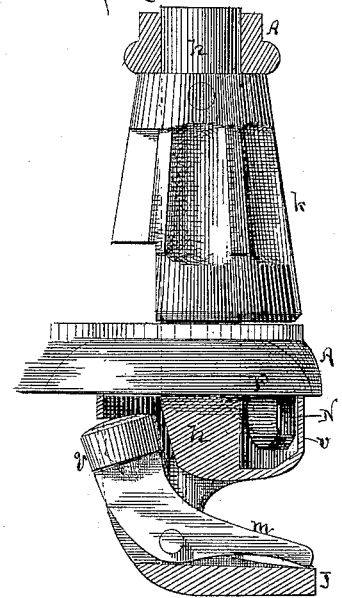
Figure 3:
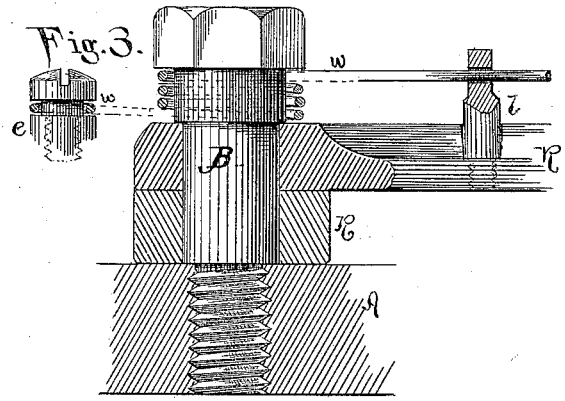
Figure 4:
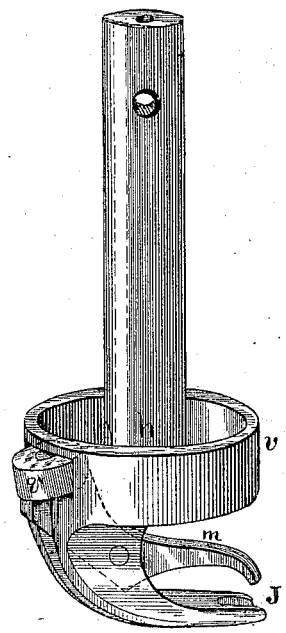
Figure 5:
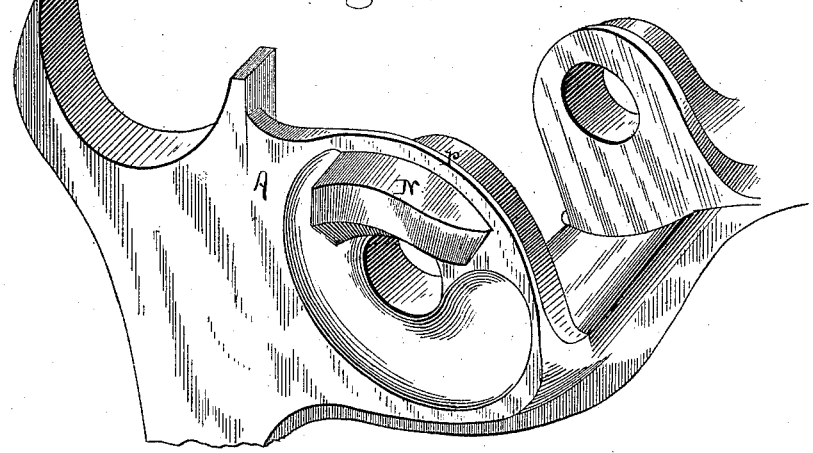

Figure 1 is a perspective view of a knotting apparatus with our improvement added. Fig. 2 is a section of the knotter-hook. Fig. 3 is a section of the stripper, showing our attachment-spring. Fig. 4 is a perspective view of the knotting-bill and spindle detached. Fig. 5 is a perspective view of a part of the knotter-frame, showing the bearings for the spindle of the knotter-hook and the cam for operating the knotter-jaw.

The rotating knotters of the class to which this belongs have heretofore been liable to obstruction by straw or other obstructing matter winding around the spindle or shaft of the knotter, and thereby preventing the pivoted jaw from working freely. This we correct by a shield attached to the hook spindle or shaft, and inclosing the upper end of the movable jaw and its actuating-cam.

A is the frame of the knotter, provided with the sleeve-bearing $b$ for the driving-shaft, and feet $d$, whereby said frame may be bolted to the frame of the binder. The driving mechanism is not shown herein because it is well understood and does not enter into the subject of this patent; but for convenience and a clear understanding the parts immediately concerned and shown in the drawings will be referred to.

E is the notched disk-rotating holder for the cord. It is caused to rotate by the reciprocating pawl $f$, operated by the reciprocating bolt $g$, actuated by a revolving cam. (Not shown.)

H is the clamp which incloses the edge of the holder E and grips the cord thereon. Said clamp is forced upon the disk with a yielding pressure by the spring $i$.

J is the rotating knotter, provided with a pinion, $k$, which is rotated by a segment-gear. (Not shown.) The knotter-hook J is provided with a pivoted gripping-jaw, $m$, which is caused to open by a stationary cam, N, rigidly attached to the frame which forms the bearing of the knotter, at $p$, and said jaw is caused to close by an elastic cam, Q, pivoted to the frame and forced forward with an elastic pressure by a spring, $r$, having a nut behind it, whereby its tension may be regulated. The cams N and Q do not differ from those heretofore used. The cams N and Q are located in proper positions to cause the jaw $m$ to open and close at proper points in its rotation.

R is the vibrating stripper, its arm pivoted to the frame and actuated by the rotating cam, (not shown,) which engages its free end $t$. The stripper R also carries the knife $n$, whereby the cord is severed when the knot has been tied.

Heretofore it has been found that the straw of the sheaf, as well as the string of the band, is liable to catch above the friction-roller $q$ and upper end of the jaw $m$, and so be wound around and jammed against the shaft $h$ and cam N that the action of the knotter in tying the knot is entirely defeated. Our invention is directed against this defect, and it is remedied by providing the base of the knotting-hook with an annular flange or shield, $v$, which projects upward outside of the bearing all around and inclosing the cam N and upper end of the movable jaw $m$, which is armed with a friction-roller, $q$, to traverse the cam N. The edge of this flange moves close to the overhanging plate of the frame $p$, and prevents straw or obstructing matter of any kind which crowds toward the bearing from getting into the cam-track or under the friction-roller, where it might clog the parts and stop the tying of the knot by breaking the band or clogging the tying-bill, &c.

It is desirable that the stripper shall have imparted to it a positive motion derived directly from the cam to obviate lost motion inseparable from the use of intermediate parts. The stripper R is therefore pivoted to the frame and its upper end provided with a friction-roller, $t$, which traverses the usual actuating-cam. The cam referred to, as well as the stripper herein shown and described, are ordinary and well-known forms. It is also desirable that the stripper and knife $n$ shall be more promptly and quickly returned to their initial position than has been feasible by the action of gravity or a cam, as heretofore, and we have preferred to use a spring, $w$, for the purpose, securing one end to the stud $e$, and thence passing around the pivot-bolt B three times (more or less) and passing the free end through the stud $l$, set in the arm of the stripper R. This is an exceedingly easy and efficacious arrangement, without liability to derangement, and easy to replace if disabled.

Having described our invention, we claim—

1. The tying bill or hook and its pivoted jaw provided with a covering or shield rigidly attached to the stem of said tying bill or hook and concentric therewith, to prevent the wrapping of the string or any obstructing matter around stem or bearing of bill-hook, substantially as shown and described.

2. The knotting-hook J, provided with a shield-flange, $v$, rigidly connected to and extending parallel with the journal-shaft of the hook, but at a distance therefrom and terminating in close proximity with the frame, so as to inclose the cam N and constitute a shield around the journal to prevent obstructing matter from wrapping around the journal bearing or stem of bill-hook.

WILLIAM N. WHITELEY.
WILLIAM BAYLEY.
SAMUEL DYER.

Witnesses:
F. B. FURNISS,
SOL J. HOUCK.